US012613437B2

(12) United States Patent
Cruz et al.

(10) Patent No.: US 12,613,437 B2
(45) Date of Patent: Apr. 28, 2026

(54) OPTICAL ISOLATOR SYSTEM

(71) Applicant: NORTHROP GRUMMAN SYSTEMS CORPORATION, Falls Church, VA (US)

(72) Inventors: Bianca Cruz, Thousand Oaks, CA (US); Daniel A. Tazartes, West Hills, CA (US); Gregory A. Zimmerman, Sandy, UT (US); Jonathan M. Wheeler, Woodland Hills, CA (US); Steven M. Kim, Santa Clara, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 588 days.

(21) Appl. No.: 18/164,968

(22) Filed: Feb. 6, 2023

(65) Prior Publication Data

US 2024/0264475 A1 Aug. 8, 2024

(51) Int. Cl.
| | |
|---|---|
| *G02F 1/095* | (2006.01) |
| *G01C 19/72* | (2006.01) |
| *G02F 1/01* | (2006.01) |
| *G02F 1/09* | (2006.01) |

(52) U.S. Cl.
CPC ......... *G02F 1/0955* (2013.01); *G01C 19/721* (2013.01); *G02F 1/0136* (2013.01); *G02F 1/092* (2013.01); *G02F 2203/50* (2013.01)

(58) Field of Classification Search
None
See application file for complete search history.

(56) References Cited

U.S. PATENT DOCUMENTS

| | | | | |
|---|---|---|---|---|
| 4,974,944 A | * | 12/1990 | Chang | G02F 1/093 |
| | | | | 359/489.08 |
| 5,345,329 A | | 9/1994 | Shirai et al. | |
| 5,774,264 A | * | 6/1998 | Konno | G02B 6/272 |
| | | | | 359/489.05 |

(Continued)

FOREIGN PATENT DOCUMENTS

| | | | |
|---|---|---|---|
| KR | 100401137 B1 | 10/2023 | |

OTHER PUBLICATIONS

WOISR (Written Opinion and International Search Report) for corresponding PCT/US2024/011707, mailed May 9, 2024.

*Primary Examiner* — Derek S. Chapel
(74) *Attorney, Agent, or Firm* — Tarolli, Sundheim, Covell & Tummino LLP

(57) ABSTRACT

An optical isolator system includes an optical isolator element that transmits a first optical beam provided at a first port to be output from a second port and blocks a second optical beam provided at the second port from being output from the first port. The optical beams each include a first component and a second component that are orthogonally linearly polarized. The optical isolator element can provide optical isolation based on transverse shifting the first and second components of the optical beams relative to each other to provide propagation of the first optical beam from the first port to the second port and to prevent propagation of the second optical beam from the second port to the first port. At least one phase adjuster adjusts a relative phase of the first and second components of the first optical beam to align the components of the first optical beam.

17 Claims, 3 Drawing Sheets

(56)                    References Cited

U.S. PATENT DOCUMENTS

| | | | |
|---|---|---|---|
| 5,835,270 A * | 11/1998 | Urino | G02F 1/093 |
| | | | 359/484.04 |
| 6,049,425 A * | 4/2000 | Watanabe | G02F 1/093 |
| | | | 359/484.04 |
| 6,055,101 A | 4/2000 | Bergmann et al. | |
| 6,088,153 A | 7/2000 | Anthon et al. | |
| 7,715,664 B1 * | 5/2010 | Shou | G02B 6/4208 |
| | | | 385/11 |
| 10,105,992 B2 | 10/2018 | Uchida | |
| 10,337,867 B1 * | 7/2019 | Dimashkie | G01C 19/721 |
| 2005/0069242 A1 | 3/2005 | Fujita et al. | |
| 2018/0259337 A1 | 9/2018 | Wang | |
| 2021/0325610 A1 | 10/2021 | Rogers et al. | |

* cited by examiner

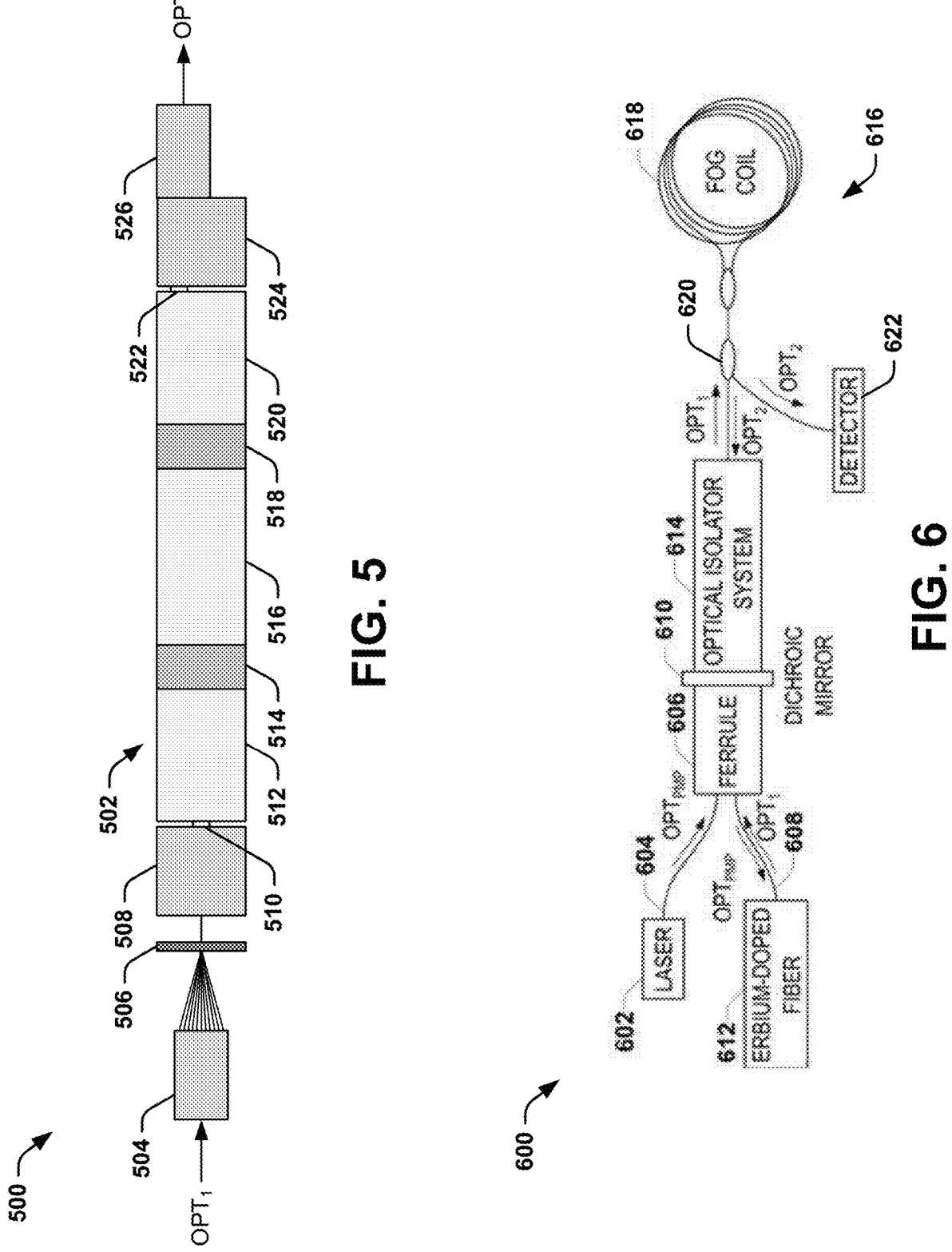

OPTICAL ISOLATOR SYSTEM

TECHNICAL FIELD

This disclosure relates generally to optical systems, and more specifically to an optical isolator system.

BACKGROUND

Optical systems are currently implemented for a large variety of applications, such as optical communications, imaging, and sensors. Optical beams and signals are often provided along the same optical paths in a collinear manner, and in some cases can be provided anti-parallel with respect to each other in an opposite propagation path. In certain cases, it may be necessary to allow optical propagation of optical beams and signals in one direction in an optical propagation path but prohibit optical signals in the opposite direction. Thus, optical isolators can be implemented that provide a unidirectional optical path of optical beams and signals. As an example, in a fiber-optic gyroscope (FOG) system, an optical beam that is provided into two inputs of a FOG coil can propagate back to the source of the optical beam, which can be detrimental to the operation of the beam source that generates the optical beam. Thus, in this example, an optical isolator can allow the optical beam to be provided to the FOG coil, but will prohibit the optical beam to back-propagate to the optical source.

SUMMARY

One example includes an optical isolator system. An optical isolator element transmits a first optical beam provided at a first port to be output from a second port and blocks a second optical beam provided at the second port from being output from the first port. The optical beams each include a first component and a second component that are orthogonally linearly polarized. The optical isolator element can provide optical isolation based on transverse shifting the first and second components of the optical beams relative to each other to provide propagation of the first optical beam from the first port to the second port and to prevent propagation of the second optical beam from the second port to the first port. At least one phase adjuster adjusts a relative phase of the first and second components of the first optical beam to align the components of the first optical beam.

Another example includes an optical isolator system. The system includes an optical isolator element configured to transmit a first optical beam provided at a first port to be output from a second port and to block a second optical beam provided at the second port from being output from the first port. The first and second optical beams each include a first component and a second component that are orthogonally linearly polarized with respect to each other. The optical isolator element includes a first birefringent crystal coupled to the first port, a first Faraday rotator coupled to the first birefringent crystal, a second birefringent crystal coupled to the first Faraday rotator, a second Faraday rotator coupled to the second birefringent crystal, and a third birefringent crystal coupled between the second Faraday rotator and the second port. The system further includes at least one phase adjuster configured to adjust a relative phase of the first and second components of the first optical beam to align the first and second components of the first optical beam.

Another example includes an optical system. The system includes a laser configured to generate an optical pump beam and an erbium-doped fiber (EDF) configured to receive the optical pump beam and to generate a first optical beam. The system also includes an optical isolator system. The optical isolator system includes an optical isolator element configured to transmit the first optical beam provided at a first port to be output from a second port and to block a second optical beam provided at the second port from being output from the first port. The first and second optical beams each include a first component and a second component that are orthogonally linearly polarized with respect to each other. The optical isolator element can provide optical isolation based on transverse shifting the first and second components of the first and second optical beams relative to each other to provide propagation of the first optical beam from the first port to the second port and to prevent propagation of the second optical beam from the second port to the first port. The optical isolator system further includes at least one phase adjuster configured to adjust a relative phase of the first and second components of the first optical beam to align the first and second components of the first optical beam. The system further includes an optical coupler configured to receive the first optical beam output from the second port of the optical isolator system and to provide the second optical beam to the second port of the optical isolator system.

BRIEF DESCRIPTION OF THE DRAWINGS

FIG. 5 illustrates another example of an optical isolator system.

FIG. 6 illustrates an example of a fiber-optic gyroscope (FOG) system.

DETAILED DESCRIPTION

Figure 1:
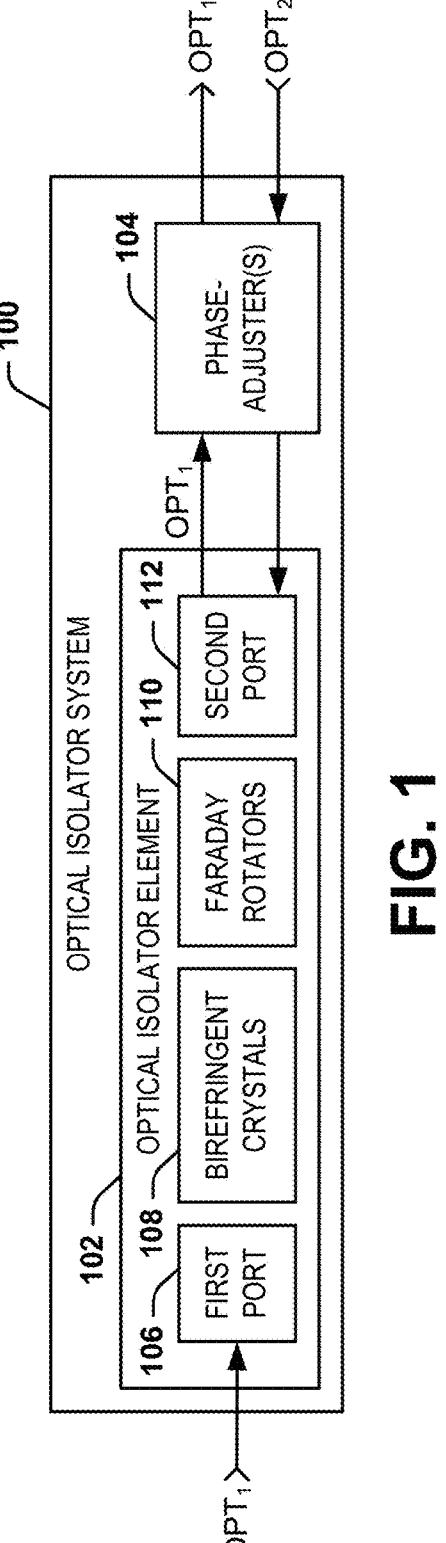
FIG. 1 illustrates an example block diagram of an optical isolator system.

This disclosure relates generally to optical systems, and more specifically to an optical isolator system. The optical isolator system can be implemented in any of a variety of optical applications that may require unidirectional propagation of an optical signal or optical beam along an optical propagation path (e.g., in free space or in an optical fiber). As an example, the optical isolator system may be implemented in a fiber-optic gyroscope (FOG) system to facilitate unidirectional propagation of an optical beam into a FOG coil.

The optical isolator system described herein can include an optical isolator element. The optical isolator element can transmit (e.g., propagate) a first optical beam provided at a first port through the optical isolator element to be output from a second port. The optical isolator element can block a second optical beam provided at the second port from propagating through and being output from the first port. The first and second optical beams each include a first component and a second component that are orthogonally linearly polarized with respect to each other. As an example, the optical isolator element can include an alternating sequence of birefringent crystals and Faraday rotators. Therefore, the optical isolator element can be configured to transverse shift the first and second components of the first and second optical beams relative to each other based on a relative linear polarization. As described herein, the term "transverse shift" refers to an angular change from a propagation direction of one of the components of the optical beam, resulting in an increasing or decreasing transverse and/or radial separation (e.g., walk-off) of the components of the optical beam along the length of the optical isolator element.

For example, regarding the term "transverse shift," the system can be described in which the first optical beam propagates along a Z-axis. A first birefringent crystal can be oriented in such a way that the extraordinary polarization of the first optical beam experiences a walk-off in the Y-direction with respect to the ordinary polarization of the first optical beam. After the first birefringent crystal, the first optical beam can pass through a Faraday rotator that rotates the polarization of both the ordinary and extraordinary fields (e.g., by 45° counterclockwise). Both polarizations can then pass through a second birefringent crystal having a crystal axis that is coplanar with the linear polarization of the ordinary field after it passed through the Faraday rotator (e.g., it is coplanar with the Z-axis and a line in the XY-plane that is rotated 45° clockwise from the X-axis, as described in greater detail herein), such that the ordinary light in the first birefringent crystal experiences a walk-off in the second birefringent crystal, whereas the extraordinary light in the first birefringent crystal does not experience a walk-off in the second birefringent crystal. Therefore the second birefringent crystal in the sequence can produce a walk-off that is different than the walk-off produced by the first birefringent crystal. A similar phenomenon can thus occur in a third birefringent crystal relative to the second birefringent crystal, as described in greater detail herein.

The system further includes at least one phase adjuster configured to adjust a relative phase of the first and second components of the first optical beam, thereby aligning the first and second components of the first optical beam. As an example, the transverse shifting of the components of the first optical beam can result in a path length that is different for the components of the first optical beam, such that the second component can have a shorter path length than the first component. Therefore, the phase adjuster(s) can provide a phase-delay of the second component based on the polarization of the first component to phase-align the first and second components of the first optical beam. Therefore, the first and second components can have a common wavefront. As an example, the phase adjuster(s) can include a first phase adjuster at an input of the optical isolator element that provides a coarse adjustment to the phase of the second component, and a second phase adjuster that is arranged at an output of the optical isolator element that provides a fine adjustment of the phase of the second component.

FIG. 1 illustrates an example block diagram of an optical isolator system 100. The optical isolator system 100 can be implemented in any of a variety of optical applications that requires unidirectional propagation of an optical signal or optical beam along an optical propagation path (e.g., in free space or in an optical fiber). As an example, the optical isolator system 100 may be implemented in a fiber-optic gyroscope (FOG) system to facilitate unidirectional propagation of an optical beam into a FOG coil.

The optical isolator system 100 includes an optical isolator element 102 and at least one phase adjuster 104. The optical isolator element 102 includes a first port 106, a set of birefringent crystals 108, a set of Faraday rotators 110, and a second port 112. As an example, the first port 106 and the second port 112 can correspond to any component or medium in which the optical beams can propagate to and from the optical isolator element 102, which could include an optical beam being incident on a birefringent crystal or exiting a birefringent crystal. As another example, the Faraday rotators 110 can be fabricated from a latching Faraday material (e.g., Bismuth-doped rare-earth iron latched garnet film) which are permanently magnetized. Therefore, the use of a latching Faraday material for the Faraday rotators 110 can avoid the requirement of an externally provided strong magnetic field to provide Faraday rotation, as such external magnetic fields can also provide spurious optical rotation in other parts of the associated optical system that can result in non-reciprocal phase-shift, thereby degrading performance of the optical system.

The optical isolator element 102 is demonstrated as receiving a first optical beam $OPT_1$ at a first end at the first port 106 and receiving a second optical beam $OPT_2$ at a second end opposite the first end at the second port 112. The first and second optical beams $OPT_1$ and $OPT_2$ can have the same optical characteristics (e.g., frequency and polarization). The optical isolator element 102 is also demonstrated as providing the first optical beam $OPT_1$ as an output from the second port 112. As described in greater detail herein, the optical isolator element 102 is configured to propagate the first optical beam $OPT_1$ provided at the first port 106 through the optical isolator element 102 to be output from the second port 112, and to block the second optical beam $OPT_2$ provided at the second port 112 from propagating through and being output from the first port 106, thereby providing unidirectional propagation of an optical beam.

To implement the unidirectional propagation of the first optical beam $OPT_1$, the birefringent crystals 108 and the Faraday rotators 110 can be arranged in an alternating sequence. For example, the birefringent crystals 108 can include a set of three, and the Faraday rotators 110 can include a set of two, such that the optical isolator element 102 can include a first of the birefringent crystals 108 coupled to the first port 106, a first of the Faraday rotators 110 coupled to the first of the birefringent crystals 108, a second of the birefringent crystals 108 coupled to the first of the Faraday rotators 110, a second of the Faraday rotators 110 coupled to the second of the birefringent crystals 108, and a third of the birefringent crystals 108 coupled between the second of the Faraday rotators 110 and the second port 112. Therefore, based on the arrangement of the birefringent crystals 108 and the Faraday rotators 110, the optical isolator element 102 can be configured to provide transverse shift the first and second components of the first and second optical beams $OPT_1$ and $OPT_2$ relative to each other based on a relative linear polarization.

As an example, the first and second optical beams $OPT_1$ and $OPT_2$ each include a first component and a second component that are orthogonally linearly polarized with respect to each other. For example, the crystal axes of the birefringent crystals 108 can each be rotated (e.g., by 45°) relative to a previous one in the sequence, such that a given one of the birefringent crystals can provide transverse shift of one of the components of the optical beam. The Faraday rotators 110 can thus change the orientation of the linear polarization of the components of the optical beams $OPT_1$ and $OPT_2$ (e.g., by 45°). Therefore, the next birefringent crystal 108 in the sequence can provide transverse shift of the components of the optical beam in a different manner. As an example, the first and second ports 106 and 112 can be laterally offset with respect to each other. Therefore, in a first direction through the optical isolator element 102, the transverse shifting of the components of the first optical beam $OPT_1$ can result in the first and second components being transverse shifted through the optical isolator element 102 from the first port 106 to be rejoined at the second port 112 in a laterally offset manner, as described in greater detail herein. However, in a second direction opposite the first direction through the optical isolator element 102, the transverse shifting of the components of the second optical beam $OPT_2$ can result in the first and second components being transverse shifted through the optical isolator element 102 from the second port 112 in a manner that neither of the first and second components of the second optical beam $OPT_2$ are provided to the first port 106, as described in greater detail herein.

As described herein, the orthogonal linear polarization of the respective components of the optical beams $OPT_1$ and $OPT_2$ is not necessarily a function of prior linear polarization of the components of the optical beams $OPT_1$ and $OPT_2$. Instead, the optical beams $OPT_1$ and $OPT_2$ can be unpolarized or arbitrarily polarized optical beams prior to being input to the optical isolator element 102. However, the birefringent crystals 108 can provide polarization splitting of the optical beams $OPT_1$ and $OPT_2$ to separate the optical beams $OPT_1$ and $OPT_2$ into the orthogonally linearly polarized components based on the transverse shifting of the component portions of the optical beams $OPT_1$ and $OPT_2$ relative to each other. Therefore, as described herein, the optical beams $OPT_1$ and $OPT_2$ are not limited to being comprised of the orthogonally linearly polarized components as provided to the optical isolator system 100.

The phase adjuster(s) 104 are configured to adjust a relative phase of the first and second components of the first optical beam $OPT_1$, thereby phase-aligning the first and second components of the first optical beam $OPT_1$. As an example, the anisotropy of the birefringent crystals 108 presents the two components of the first optical beam with different refractive indices, such that the second component can have a shorter optical path length than the first component. Therefore, the phase adjuster(s) 104 can provide a phase-delay of the second component based on the polarization of the second component to phase-align the first and second components of the first optical beam $OPT_1$. Therefore, the first and second components of the first optical beam $OPT_1$ can have a common wavefront. As an example, the phase adjuster(s) 104 can include a first phase adjuster at an input of the optical isolator element 102 that provides a fine adjustment to the phase of the second component, and a second phase adjuster that is arranged at an output of the optical isolator element 102 that provides a coarse adjustment of the phase of the second component.

Figure 2:
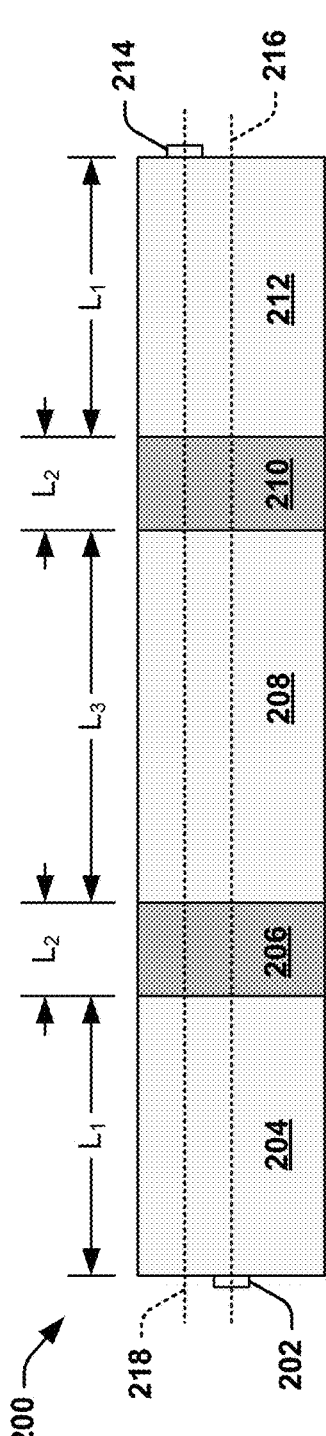
FIG. 2 illustrates an example of an optical isolator element.

FIG. 2 illustrates an example of an optical isolator element 200. The optical isolator element 200 can correspond to the optical isolator element 102 in the example of FIG. 1. Therefore, reference is to be made to the example of FIG. 1 in the following description of the example of FIG. 2.

The optical isolator element 200 includes a first port 202, a first birefringent crystal 204 coupled to the first port 202, a first Faraday rotator 206 coupled to the first birefringent crystal 204, a second birefringent crystal 208 coupled to the first Faraday rotator 206, a second Faraday rotator 210 coupled to the second birefringent crystal 208, and a third birefringent crystal 212 coupled between the second Faraday rotator 210 and a second port 214. In the example of FIG. 2, the first port 202 and the second port 214 are demonstrated as physical components (e.g., apertures), but can instead correspond to any component or medium in which the optical beams can propagate to and from the optical isolator element 200, which could include a region of space on the surface of the birefringent crystals 204 and 212, respectively. Additionally, the first port 202 is demonstrated along a first axis 216 and the second port 214 is demonstrated along a second axis 218 that is parallel and laterally offset from the first axis 216.

The birefringent crystals 204, 208, and 212 can be formed from any of a variety of materials that exhibit birefringence (e.g., Yttrium orthovanadate ($YVO_4$)). In the example of FIG. 2, the first birefringent crystal 204 is demonstrated as having a length $L_1$ that can be selected to provide transverse shifting of a component of an optical beam at a predetermined transverse offset from the other component of the optical beam. The first Faraday rotator 206 is demonstrated as having a length $L_2$ that can be selected to provide an approximate 45° Faraday rotation of a linearly polarized optical beam. The second birefringent crystal 208 can be rotated approximately 45° about an axial length of the optical isolator element 200 (e.g., about the axis 216) relative to the first birefringent crystal 204. The second birefringent crystal 208 is demonstrated as having a length $L_3$ that can be selected to provide transverse shifting a component of an optical beam at a predetermined transverse offset from the other component of the optical beam. As an example, the length L can be longer than the length $L_1$ (e.g., $\sqrt{2}*L_1$). The second Faraday rotator 210 is demonstrated as having the length $L_2$. The third birefringent crystal 212 can be rotated approximately 45° about an axial length of the optical isolator element 200 (e.g., about the axis 216) relative to the second birefringent crystal 208, and thus approximately 90° relative to the first birefringent crystal 204. The third birefringent crystal 212 is demonstrated as having the length $L_1$.

Figures 3, 4:
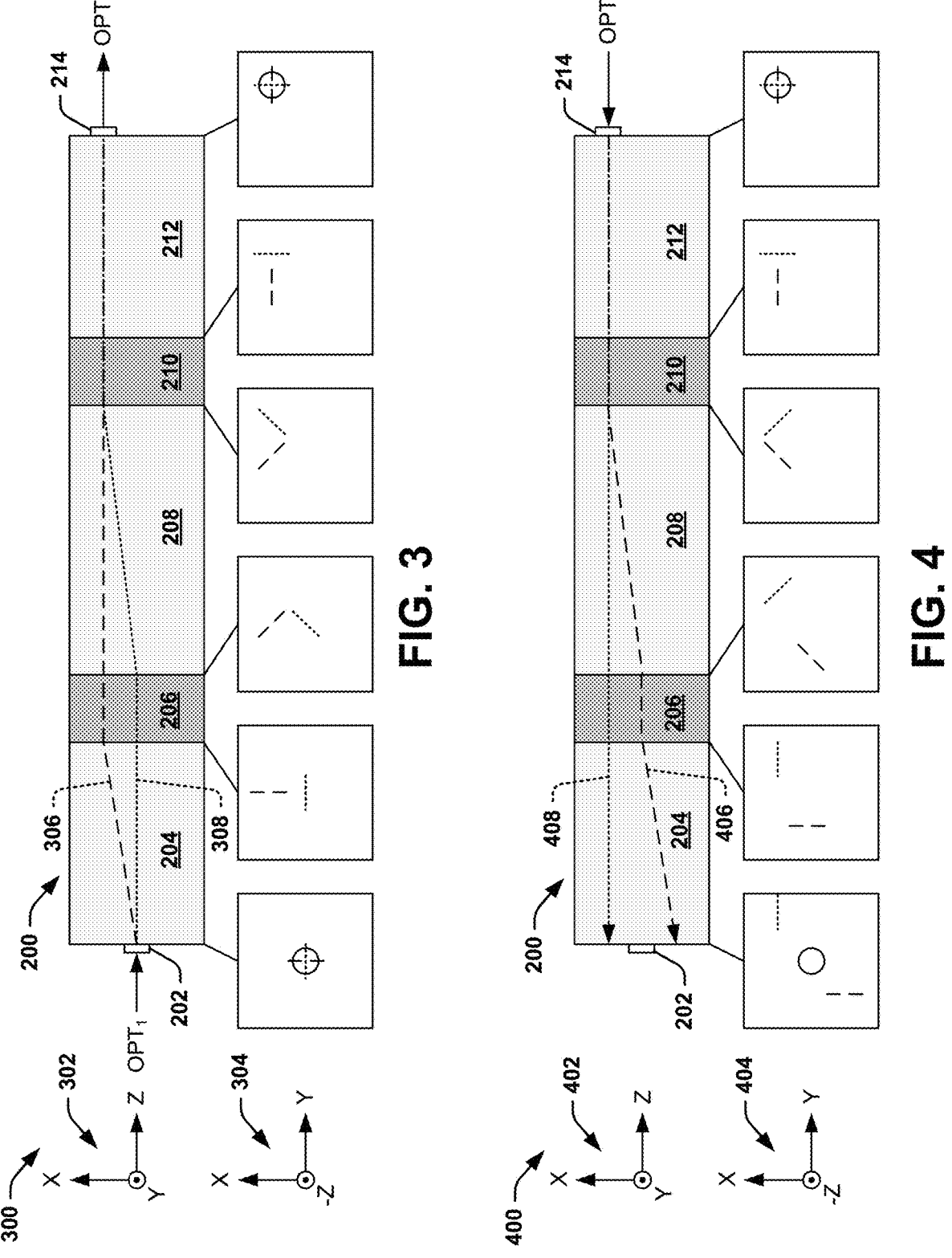
FIG. 3 illustrates an example diagram of an optical isolator element.
FIG. 4 illustrates another example diagram of an optical isolator element.

FIG. 3 illustrates an example diagram 300 of the optical isolator element 200. The diagram 300 demonstrates the first optical beam $OPT_1$ being provided through the optical isolator element 200. The diagram 300 includes a first Cartesian coordinate system 302 that demonstrates the coordinate frame of the optical isolator element 200 and a second Cartesian coordinate system 304 that demonstrates the coordinate frame of a cross-section of the optical isolator element 200.

In the example of FIG. 3, the first optical beam $OPT_1$ is provided to the first port 202. The first optical beam $OPT_1$ includes a first component 306 demonstrated by a dashed line and a second component 308 demonstrated by a dotted line. As described above, the first and second components 306 and 308 are orthogonally linearly polarized with respect to each other. The first component 306 is demonstrated as vertically linearly polarized and the second component 308 is demonstrated as horizontally linearly polarized. As the first optical beam $OPT_1$ propagates through the first birefringent crystal 204 (along the Z-axis), the first component 306 transverse shifts in the X-direction while the second component 308 remains unshifted. As an example, upon propagating the length $L_1$, the transverse shift can be approximately equal to the vector distance of the transverse offset between the two axes 216 and 218 projected along the X-axis.

Upon the first optical beam $OPT_1$ being provided to the first Faraday rotator 206, the linear polarizations of each of the first and second components 306 and 308 can be rotated approximately 45° in a counter-clockwise manner in the XY-plane. As the first optical beam $OPT_1$ propagates through the second birefringent crystal 208 (along the Z-axis), based on the change in linear polarization and based on the 45° orientation of the second birefringent crystal 208 relative to the first birefringent crystal 204, the second component 308 transverse shifts in the XY-direction while the first component 306 remains unshifted. As an example, upon propagating the length $L_3$, the transverse shift can be approximately equal to the distance of the transverse offset between the two axes 216 and 218 in the XY-direction. Therefore, upon propagating the length $L_3$, the second component 308 can be approximately aligned with the second port 214.

Upon the first optical beam $OPT_1$ being provided to the second Faraday rotator 210, the linear polarizations of each of the first and second components 306 and 308 can be rotated an additional approximately 45° in a counter-clockwise manner in the XY-plane. As the first optical beam $OPT_1$ propagates through the third birefringent crystal 212 (along the Z-axis), based on the change in linear polarization and based on the 45° orientation of the third birefringent crystal 212 relative to the second birefringent crystal 208, the first component 306 transverse shifts in the Y-direction while second component 308 remains unshifted. As an example, upon propagating the length $L_1$, the transverse shift can be approximately equal to the vector distance of the transverse offset between the two axes 216 and 218 along the Y-axis. Therefore, upon propagating the length $L_1$, the first component 306 can be approximately aligned with the second port 214, such that the first and second components 306 and 308 can be again combined in a collinear propagation to be provided from the second port 214.

FIG. 4 illustrates another example diagram 400 of the optical isolator element 200. The diagram 400 demonstrates the second optical beam $OPT_2$ being provided through the optical isolator element 200. The diagram 400 includes a first Cartesian coordinate system 402 that demonstrates the coordinate frame of the optical isolator element 200 and a second Cartesian coordinate system 404 that demonstrates the coordinate frame of a cross-section of the optical isolator element 200.

In the example of FIG. 4, the second optical beam $OPT_2$ is provided to the second port 214. The second optical beam $OPT_2$ includes a first component 406 demonstrated by a dashed line and a second component 408 demonstrated by a dotted line. As described above, the first and second components 406 and 408 are orthogonally linearly polarized with respect to each other. As an example, the second optical beam $OPT_2$ can be substantially identical to the first optical beam $OPT_1$. The first component 406 is demonstrated as horizontally linearly polarized (e.g., along the Y-axis) and the second component 408 is demonstrated as vertically linearly polarized (e.g., along the X-axis). As the second optical beam $OPT_2$ propagates through the third birefringent crystal 212 (along the –Z-axis), the first component 406 transverse shifts in the –Y-direction while the second component 408 remains unshifted. As an example, upon propagating the length $L_1$, the transverse shift can be approximately equal to the vector distance of the transverse offset between the two axes 216 and 218 along the –Y-axis.

Upon the second optical beam $OPT_2$ being provided to the second Faraday rotator 210, the linear polarizations of each of the first and second components 406 and 408 can be rotated approximately 45° in a counter-clockwise manner in the XY-plane. As the second optical beam $OPT_2$ propagates through the second birefringent crystal 208 (along the –Z-axis), based on the change in linear polarization and based on the 45° orientation of the second birefringent crystal 208 relative to the third birefringent crystal 212, the first component 406 transverse shifts in the –XY-direction while the second component 408 remains unshifted. As an example, upon propagating the length $L_3$, the transverse shift can be approximately equal to the distance of the transverse offset between the two axes 216 and 218 in the XY-direction, but offset from the axis 216 based on the transverse shift provided by the third birefringent crystal 212.

Upon the second optical beam $OPT_2$ being provided to the first Faraday rotator 206, the linear polarizations of each of the first and second components 406 and 408 can be rotated an additional approximately 45° in a counter-clockwise manner in the XY-plane. As the second optical beam $OPT_2$ propagates through the first birefringent crystal 204 (along the –Z-axis), the first component 406 transverse shifts in the –X-direction while the second component 408 remains unshifted. As an example, upon propagating the length $L_1$, the transverse shift can be approximately equal to the vector distance of the transverse offset between the two axes 216 and 218 along the –X-axis. Therefore, in the example of FIG. 4, upon propagating through the first birefringent crystal 204, neither the first component 406 nor the second component 408 are aligned with the first port 202. Therefore, the example of FIG. 4 demonstrates that the second optical beam $OPT_2$ is blocked from propagating through the optical isolator element 200 in the opposite direction of the first optical beam $OPT_1$.

FIG. 5 illustrates another example of an optical isolator system 500. The optical isolator system 500 can correspond to the optical isolator system 100 in the example of FIG. 1. Therefore, reference is to be made to the examples of FIGS. 1-4 in the following description of the example of FIG. 5. Similar to as described above, the optical isolator system 500 can be implemented in any of a variety of optical applications that requires unidirectional propagation of an optical signal or optical beam along an optical propagation path (e.g., in free space or in an optical fiber). As an example, the optical isolator system 500 may be implemented in a FOG system to facilitate unidirectional propagation of an optical beam into a FOG coil.

The optical isolator system 500 includes an optical isolator element 502 and a lens 504 that is configured to focus the first optical beam $OPT_1$ to an aperture 506. As an example, the lens 504 can be configured as a gradient-index (GRIN) lens. The aperture 506 can correspond to an opaque material that includes a small hole through which the first optical beam $OPT_1$ can be provided. The first optical beam $OPT_1$ can thus be provided through the aperture 506 based on the focusing of the first optical beam $OPT_1$ via the lens 504. The focused portion of the first optical beam $OPT_1$ can thus be provided to a phase adjuster 508. The phase adjuster 508 can be configured to phase-delay the second component of the first optical beam $OPT_1$ based on a polarization of the second component.

As an example, the aperture 506 can be formed from an opaque/absorptive material with a very narrow opening (e.g., a pin hole) having a diameter that can advantageously be set to barely allow substantially all of the light from the first port to pass through. As described above in the example of FIG. 2, the birefringent crystals 204, 208, and 212 can be formed from $YVO_4$. Because the refractive index of $YVO_4$ is so large compared to air, there can be strong internal reflections of the light as it passes through the optical isolator element 508. It is possible that after several reflections, some of the light from the first port can couple back into the first port. Furthermore, some light that enters from the second port may bounce several times and couple into the first port. Therefore, the aperture 506 can mitigate reflections back to the first port. Furthermore, as another example, the aperture 506 can be located at a position at which the light is focused by the lens 504 at the smallest waist. Accordingly, by minimizing the diameter of the aperture 506 and forming the material around the aperture 506 with an opaque/absorptive material, optical reflection back through the aperture 506 from the input of the optical isolator element 502 can be mitigated.

As an example, both polarizations of the second optical beam $OPT_2$ demonstrated in the example of FIG. 4 can couple back into any optical system used to generate the first optical beam $OPT_1$ without some blocking filter at the position of the aperture 506. To mitigate such coupling, a typical optical isolator can have birefringent crystals fabricated with lengths that are very long to achieve a large displacement (e.g., approximately 100 microns of beam displacement for every one millimeter of $YVO_4$). As an example, such birefringent crystals in a typical optical isolator can have lengths in the range of tens of millimeters to separate the polarization components of a returning optical beam from the millimeter scale aperture of associated input optics. However, by implementing the focusing lens 504 and the very small pinhole aperture 506 of the optical isolator system 500, the birefringent crystals 512, 516, and 520 can be fabricated with very short lengths. As a result, the first optical beam $OPT_1$, when focused in the aperture plane of the aperture 506, may only need be separated by a few hundred microns for an aperture 506 of a few tens of microns. As an example, if the length $L_1$ of the birefringent crystals 512 and 520 is approximately three millimeters, the second optical beam $OPT_2$ could entirely couple back into the input optics absent the aperture 506, thereby rendering the optical isolator system useless.

With reference to the example of FIG. 3, the second component 308 of the first optical beam $OPT_1$ transverse shifts in the XY-direction through the second birefringent crystal 208. By contrast, the first component 306 transverse shifts in the Y-direction through the first birefringent crystal 204 and in the X-direction through the third birefringent crystal 212. Therefore, in the XY-plane, the transverse shift of the second component 308 traverses the hypotenuse of a triangle that is bounded by the transverse shift of the first component 306 along the legs of the same triangle. As a result, the optical path of the second component 308 of the first optical beam $OPT_1$ through the optical isolator element 200 is shorter than the optical path of the first component 306 of the first optical beam $OPT_1$ through the optical isolator element 200. Therefore, the phase adjuster 508 can phase-delay the second component 308 relative to the first component 306 prior to the propagation of the first optical beam $OPT_1$ through the optical isolator element 200.

The phase adjuster 508 can be fabricated, for example, as an $YVO_4$ compensation plate, or can be formed from another material that provides polarization-dependent phase-delay (e.g., via a birefringent medium), to provide a phase-delay based on transverse shift of the second component of the first optical beam $OPT_1$. As an example, as described above, the first optical beam $OPT_1$ can correspond to unpolarized light. However, the phase adjuster 508 can phase-delay linear polarization components of the first optical beam $OPT_1$ to provide polarization beam-splitting of the first optical beam $OPT_1$ into the first and second component portions, such that the second component can be phase-delayed relative to the first component. As described in greater detail herein, the phase adjuster 508 can provide coarse phase-delay of the second component of the first optical beam $OPT_1$.

The optical isolator element 502 can correspond to the optical isolator element 200 in the examples of FIGS. 2-4. Therefore, the optical isolator element 502 includes a first port 510, a first birefringent crystal 512 coupled to the first port 510, a first Faraday rotator 514 coupled to the first birefringent crystal 512, a second birefringent crystal 516 coupled to the first Faraday rotator 514, a second Faraday rotator 518 coupled to the second birefringent crystal 516, and a third birefringent crystal 520 coupled between the second Faraday rotator 518 and a second port 522. The optical isolator element 502 can thus provide unidirectional propagation of the first optical beam $OPT_1$, as described above.

The optical isolator system 500 also includes a phase adjuster 524 coupled to the second port 522 of the optical isolator element 502. The phase adjuster 524 can provide further phase-delay of the second component of the first optical beam $OPT_1$ relative to the first component of the first optical beam $OPT_1$. As described above, the phase adjuster 508 can provide coarse phase-delay of the second component of the first optical beam $OPT_1$. Therefore, as an example, the phase adjuster 524 can provide a fine phase-delay of the second component of the first optical beam $OPT_1$. As an example, the phase adjuster 524 can be formed from quartz. Accordingly, the phase adjuster 524 can provide sufficient phase-delay of the second component relative to the first component to phase-align the first and second components of the first optical beam $OPT_1$.

As an example, implementing the phase adjuster 524 from quartz or another material (e.g., a combination of quartz and $YVO_4$) can improve manufacturability of the optical isolator system 500 based on the weaker birefringence of quartz. For example, the degree to which the phase of the first optical beam $OPT_1$ is compensated can depend on how well the manufacturer can control the relative phase-delay between the two polarizations of the respective components of the first optical beam $OPT_1$ through the crystal. As an example, such control can be achieved by accurately grinding the crystal to be as close to a desired length as possible. A strongly birefringent material (e.g., $YVO_4$ having a birefringence of approximately 0.2039) thus has a greater dependence on length than a more weakly birefringent material (e.g., quartz having a birefringence of approximately 0.0085). Accordingly, for a grinder with a given grinding resolution (e.g., to approximately 100 μm), the phase adjuster 524 fabricated from quartz can provide a finer resolution of approximately 3.44 radians, as opposed to a phase adjuster fabricated from $YVO_4$ (e.g., having a resolution of approximately 82.6 radians).

The optical isolator system 500 further includes another lens 526 (e.g., another GRIN lens) that can focus the first optical beam $OPT_1$. As an example, the lens 526 can focus the spatially separated first and second components of the first optical beam $OPT_1$ resulting from the transverse shift of the second component relative to the first component based on the phase adjuster 524, as described above. Thus, as an example, the focused first optical beam $OPT_1$ can be launched into a fiber or other optical propagation medium.

FIG. 6 illustrates an example of a FOG system 600. The FOG system 600 can be configured to measure rotation about a sensitive axis. As an example, the FOG system 600 can be implemented in a navigation system, such as for aerospace craft or nautical craft.

The FOG system 600 includes a laser 602 configured to generate an optical pump beam $OPT_{PMP}$. As an example, the optical pump beam $OPT_{PMP}$ can have a first wavelength (e.g., approximately 1470 nm). The optical pump beam $OPT_{PMP}$ can propagate via a first optical fiber 604 to a ferrule 606 that can couple the first optical fiber 604 and a second optical fiber 608. The optical pump beam $OPT_{PMP}$ can be provided via the ferrule 606 to a dichroic mirror 610. The dichroic mirror 610 can be configured to be transmissive of certain wavelengths of light (e.g., between approximately 1520 nm and approximately 1590 nm) and reflective of the remainder of light. Therefore, the dichroic mirror 610 can reflect the optical pump beam $OPT_{PMP}$ to the second optical fiber 608 via the ferrule 606. In the example of FIG. 6, the second optical fiber 608 is coupled to an erbium-doped fiber (EDF) 612. Therefore, the EDF 612 can be excited by the optical pump beam $OPT_{PMP}$ to emit the first optical beam $OPT_1$. The first optical beam $OPT_1$ can thus propagate back through the second optical fiber 608, through the ferrule 606, and through the dichroic mirror 610 that is transmissive of the wavelength of the first optical beam $OPT_1$ (e.g., approximately 1550 nm).

The FOG system 600 further includes an optical isolator system 614. The optical isolator system 614 can correspond to the optical isolator system 500. Therefore, the first optical beam $OPT_1$ can be provided in a unidirectional manner through the optical isolator element 502 of the optical isolator system 614. The first optical beam $OPT_1$ can thus be output from the optical isolator system 614 to a FOG detection system 616. In the example of FIG. 6, the FOG detection system 616 includes a FOG coil 618, an optical coupler 620, and a photodetector ("DETECTOR") 622.

The FOG detection system 616 can receive the first optical beam $OPT_1$ at each of a pair of fiber ports via the optical coupler 620 of opposing ends of the FOG coil 618, and can provide the second optical beam $OPT_2$ as a recombination of the respective outputs from the respective fiber ports corresponding to the first optical beams $OPT_1$ from the opposite respective fiber port of the FOG coil 618. As an example, the FOG detection system 616 can provide the second optical beam $OPT_2$ to a photodetector 620 to determine the rotation of the opposing fiber coils of the FOG coil 618 about a sensitive axis based on variation in intensity of the second optical beam $OPT_2$ recombined from each of the fiber ports. However, based on the arrangement of the fiber coupling of the optical isolator system 614 to the FOG detection system 616, the second optical beam $OPT_2$ is also provided back to the optical isolator system 614 by being back-fed up the fiber from which the first optical beam $OPT_1$ is provided to the FOG detection system 616. If the second optical beam $OPT_2$ could be provided to the EDF 612, the FOG system 600 would cease to operate correctly. However, because of the operation of the optical isolator system 614 to provide unidirectional propagation of the first optical beam $OPT_1$ to the FOG detection system 616, the second optical beam $OPT_2$ is prohibited from propagating to the EDF 612. Accordingly, the FOG system 600 can effectively measure the rotation of the FOG detection system 616 about the sensitive axis without interference from the second optical beam $OPT_2$ to the EDF 612.

The FOG system 600 is demonstrated as one example of an optical system that can implement the optical isolator system (e.g., the optical isolator system 614) described herein. Other optical systems and optical devices can include the optical isolator system described herein. For example, an in-line optical broadband amplifier or other type of optical sensor system can implement the optical isolator system described herein. As an example, such an in-line optical broadband amplifier can be configured to boost telecom signals, and can provide isolation of optical signals returning from a variety of optical devices, such as a wavelength division multiplexed (WDM) coupler that can tap, add, or remove individual optical signals from an optical coupler associated with an optical fiber. Accordingly, the optical isolator system described herein is not limited to being implemented in a FOG system (e.g., the FOG system 600), but can alternatively be included in a variety of other optical systems.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An optical isolator system comprising:

an optical isolator element configured to transmit a first optical beam provided at a first port to be output from a second port and to block a second optical beam provided at the second port from being output from the first port, the first and second optical beams each comprising a first component and a second component that are orthogonally linearly polarized with respect to each other, the optical isolator element providing optical isolation based on transverse shifting the first and second components of the first and second optical beams relative to each other to provide propagation of the first optical beam from the first port to the second port and to prevent propagation of the second optical beam from the second port to the first port;

a first phase adjuster coupled to the first port, the first phase adjuster being configured to phase-delay the second component of the first optical beam relative to the first component of the first optical beam prior to the first optical beam being provided to the first port;

a second phase adjuster coupled to the second port, the second phase adjuster being configured to phase delay the second component of the first optical beam relative to the first component of the first optical beam subsequent to the first optical beam being provided from the second port to phase-align the first and second components of the first optical beam;

a first lens configured to focus the first optical beam;

an aperture configured to receive a portion of the first optical beam, wherein the portion of the first optical beam is provided to the first phase adjuster; and a second lens configured to receive the first optical beam comprising the phase-aligned first and second components of the first optical beam output from the second phase adjuster.

2. The system of claim 1, wherein the optical isolator element comprises a plurality of birefringent crystals and a plurality of Faraday rotators arranged in an alternating sequence between the first and second ports, such that the first optical beam traverses each of the birefringent crystals and Faraday rotators in a first direction from the first port to the second port and the second optical beam traverses each of the birefringent crystals and Faraday rotators in a second direction opposite the first direction from the second port to the first port.

3. The system of claim 2, wherein the Faraday rotators are formed from a latching Faraday material.

4. The system of claim 2, wherein the birefringent crystals comprise a first birefringent crystal, a second birefringent crystal, and a third birefringent crystal, wherein the Faraday rotators comprise a first Faraday rotator arranged between the first and second birefringent crystals and a second Faraday rotator arranged between the second and third birefringent crystals.

5. The system of claim 4, wherein a crystal axis of the second birefringent crystal is rotated approximately 45° in a first orientation about a propagation axis of the first and second optical beams relative to the first birefringent crystal, wherein a crystal axis of the third birefringent crystal is rotated approximately 45° in the first orientation about the propagation axis relative to the second birefringent crystal.

6. The system of claim 1, wherein the first port and the second port are laterally offset with respect to each other along a length of the optical isolator element.

7. The system of claim 1, wherein the optical isolator element comprises:
   a first birefringent crystal configured to transverse shift the first component of the first optical beam and to not transverse shift the second component of the first optical beam;
   a first Faraday rotator configured to rotate a polarization of each of the first and second components of the first optical beam by approximately 45° in a first orientation;
   a second birefringent crystal configured to transverse shift the second component of the first optical beam and to not transverse shift the first component of the first optical beam;
   a second Faraday rotator configured to rotate the polarization of each of the first and second components of the first optical beam by approximately 45° in the first orientation; and
   a third birefringent crystal configured to transverse shift the first component of the first optical beam and to not transverse shift the second component of the first optical beam, such that the first and second components of the first optical beam are provided collinear at the second port.

8. The system of claim 7, wherein:
   the third birefringent crystal is configured to transverse shift the first component of the second optical beam and to not transverse shift the second component of the second optical beam;
   the second Faraday rotator is configured to rotate the polarization of each of the first and second components of the second optical beam by approximately 45° in the first orientation;
   the second birefringent crystal is configured to transverse shift the first component of the second optical beam and to not transverse shift the second component of the second optical beam;
   the first Faraday rotator is configured to rotate the polarization of each of the first and second components of the second optical beam by approximately 45° in the first orientation; and
   the first birefringent crystal is configured to transverse shift the first component of the second optical beam and to not transverse shift the second component of the second optical beam, such that neither of the first and second components of the second optical beam are provided at the first port.

9. The system of claim 1, wherein an optical path of the second component of the first optical beam is shorter than an optical path of the first component of the first optical beam, wherein the at least one phase adjuster is configured to phase-delay the second component of the first optical beam relative to the first component of the first optical beam to phase-align the first and second components of the first optical beam.

10. A fiber-optic gyroscope (FOG) system comprising the optical isolator system of claim 1, the FOG system further comprising:
   a laser configured to generate an optical pump beam;
   an erbium-doped fiber (EDF) configured to receive the optical pump beam and to generate the first optical beam; and
   a FOG detection system configured to receive the first optical beam output from the optical isolator system, to generate the second optical beam based on the first optical beam, and to determine a rotation about a sensitive axis of the FOG system based on the second optical beam.

11. An optical isolator system comprising:
   an optical isolator element configured to transmit a first optical beam provided at a first port to be output from a second port and to block a second optical beam provided at the second port from being output from the first port, the first and second optical beams each comprising a first component and a second component that are orthogonally linearly polarized with respect to each other, the optical isolator element comprising:
      a first birefringent crystal coupled to the first port;
      a first Faraday rotator coupled to the first birefringent crystal;
      a second birefringent crystal coupled to the first Faraday rotator;
      a second Faraday rotator coupled to the second birefringent crystal; and
      a third birefringent crystal coupled between the second Faraday rotator and the second port; and
   at least one phase adjuster configured to adjust a relative phase of the first and second components of the first optical beam to phase-align the first and second components of the first optical beam;
   a first lens configured to focus the first optical beam;
   an aperture configured to receive a portion of the first optical beam, wherein the portion of the first optical beam is provided to the at least one phase adjuster; and
   a second lens configured to receive the first optical beam comprising the phase-aligned first and second components of the first optical beam, at least one of the first and second lenses being coupled to a respective one of the at least one phase adjuster.

12. The system of claim 11, wherein a crystal axis of the second birefringent crystal is rotated approximately 45° in a first orientation about a propagation axis of the first and second optical beams relative to the first birefringent crystal, wherein a crystal axis of the third birefringent crystal is rotated approximately 45° in the first orientation about the propagation axis relative to the second birefringent crystal, wherein the first port and the second port are laterally offset with respect to each other along a length of the optical isolator element.

13. The system of claim 11, wherein an optical path of the second component of the first optical beam is shorter than an optical path of the first component of the first optical beam, wherein the at least one phase adjuster is configured to phase-delay the second component of the first optical beam relative to the first component of the first optical beam to phase-align the first and second components of the first optical beam.

14. An optical system comprising:

a laser configured to generate an optical pump beam;

an erbium-doped fiber (EDF) configured to receive the optical pump beam and to generate a first optical beam;

an optical isolator system, the optical isolator system comprising:

an optical isolator element configured to transmit the first optical beam provided at a first port to be output from a second port and to block a second optical beam provided at the second port from being output from the first port, the first and second optical beams each comprising a first component and a second component that are orthogonally linearly polarized with respect to each other, the optical isolator element providing optical isolation based on transverse shifting the first and second components of the first and second optical beams relative to each other to provide propagation of the first optical beam from the first port to the second port and to prevent propagation of the second optical beam from the second port to the first port; and at least one phase adjuster configured to adjust a relative phase of the first and second components of the first optical beam to phase-align the first and second components of the first optical beam;

a dichroic mirror configured to reflect the optical pump beam to the EDF and to pass the first optical beam to the optical isolator system; and an optical coupler configured to receive the first optical beam output from the second port of the optical isolator system and to provide the second optical beam to the second port of the optical isolator system.

15. The system of claim 14, wherein the optical isolator element comprises a first birefringent crystal, a second birefringent crystal, and a third birefringent crystal, wherein the Faraday rotators comprise a first Faraday rotator arranged between the first and second birefringent crystals and a second Faraday rotator arranged between the second and third birefringent crystals, such that the first optical beam traverses each of the birefringent crystals and Faraday rotators in an alternating sequence in a first direction from the first port to the second port and the second optical beam traverses each of the birefringent crystals and Faraday rotators in the alternating sequence in a second direction opposite the first direction from the second port to the first port.

16. The system of claim 14, wherein an optical path of the second component of the first optical beam is shorter than an optical path of the first component of the first optical beam, wherein the at least one phase adjuster is configured to phase-delay the second component of the first optical beam relative to the first component of the first optical beam to phase-align the first and second components of the first optical beam.

17. The system of claim 14, wherein the optical system is configured as a fiber-optic gyroscope (FOG) system, the FOG system further comprising a FOG detection system coupled to the optical coupler, the FOG detection system being configured to receive the first optical beam, to generate the second optical beam based on the first optical beam, and to determine a rotation about a sensitive axis of the FOG system based on the second optical beam.

* * * * *